(12) United States Patent
Kishima et al.

(10) Patent No.: US 9,386,233 B2
(45) Date of Patent: Jul. 5, 2016

(54) IMAGE ACQUISITION APPARATUS, IMAGE ACQUISITION METHOD, AND COMPUTER PROGRAM

(75) Inventors: Koichiro Kishima, Kanagawa (JP); Ryu Narusawa, Kanagawa (JP); Fumiyasu Suzuki, Saitama (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 13/617,418

(22) Filed: Sep. 14, 2012

(65) Prior Publication Data
US 2013/0088634 A1    Apr. 11, 2013

(30) Foreign Application Priority Data
Oct. 5, 2011  (JP) ................................ 2011-220773

(51) Int. Cl.
*H04N 5/235*  (2006.01)
*G02B 21/36*  (2006.01)

(52) U.S. Cl.
CPC ............ *H04N 5/2356* (2013.01); *G02B 21/367* (2013.01)

(58) Field of Classification Search
CPC .. G01N 21/6458; G02B 21/16; G02B 21/367; G02B 21/34; G02B 21/36; G02B 21/361; G02B 21/362; G02B 21/364; G02B 21/365; G06T 5/50; G06T 2207/30101; G06T 2207/10121; H04N 5/2356
USPC ........................ 348/345, 79–80; 359/368–398
See application file for complete search history.

(56) References Cited

U.S. PATENT DOCUMENTS

| | | | | |
|---|---|---|---|---|
| 2004/0119817 A1* | 6/2004 | Maddison | ............ | G02B 21/367 348/79 |
| 2008/0002043 A1* | 1/2008 | Inoue | ..................... | H04N 5/232 348/296 |
| 2009/0167930 A1* | 7/2009 | Safaee-Rad | .............. | G02B 7/38 348/347 |
| 2009/0231689 A1* | 9/2009 | Pittsyn | ..................... | G01B 9/04 359/363 |
| 2009/0316527 A1* | 12/2009 | Stewart | .................. | G01V 1/364 367/24 |
| 2011/0025880 A1* | 2/2011 | Nandy | ............... | G01N 21/6458 348/226.1 |
| 2011/0133054 A1* | 6/2011 | Campbell | .......... | G01B 11/0608 250/201.2 |
| 2012/0176489 A1* | 7/2012 | Oshiro | ................. | G02B 21/002 348/80 |

FOREIGN PATENT DOCUMENTS

JP    2008-500643    1/2008
JP    2011-059515  *  3/2011

* cited by examiner

*Primary Examiner* — Pritham Prabhakher
(74) *Attorney, Agent, or Firm* — Chip Law Group

(57) ABSTRACT

An image acquisition apparatus includes an optical system, an imaging device, a movement controller, and a multiple exposure processing unit. The optical system includes an objective lens for magnifying a portion of an imaging target. The imaging device is capable of performing all-pixel simultaneous exposure and is configured to image the portion magnified by the optical system. The movement controller is configured to move a focal point of the objective lens in a thickness direction of the portion of the imaging target. The multiple exposure processing unit is configured to perform multiple exposure of the imaging device at a plurality of positions such that, for each of ranges sectioned by positions in a direction in which the focal point is movable, an average image that covers each of the ranges is obtained.

8 Claims, 16 Drawing Sheets

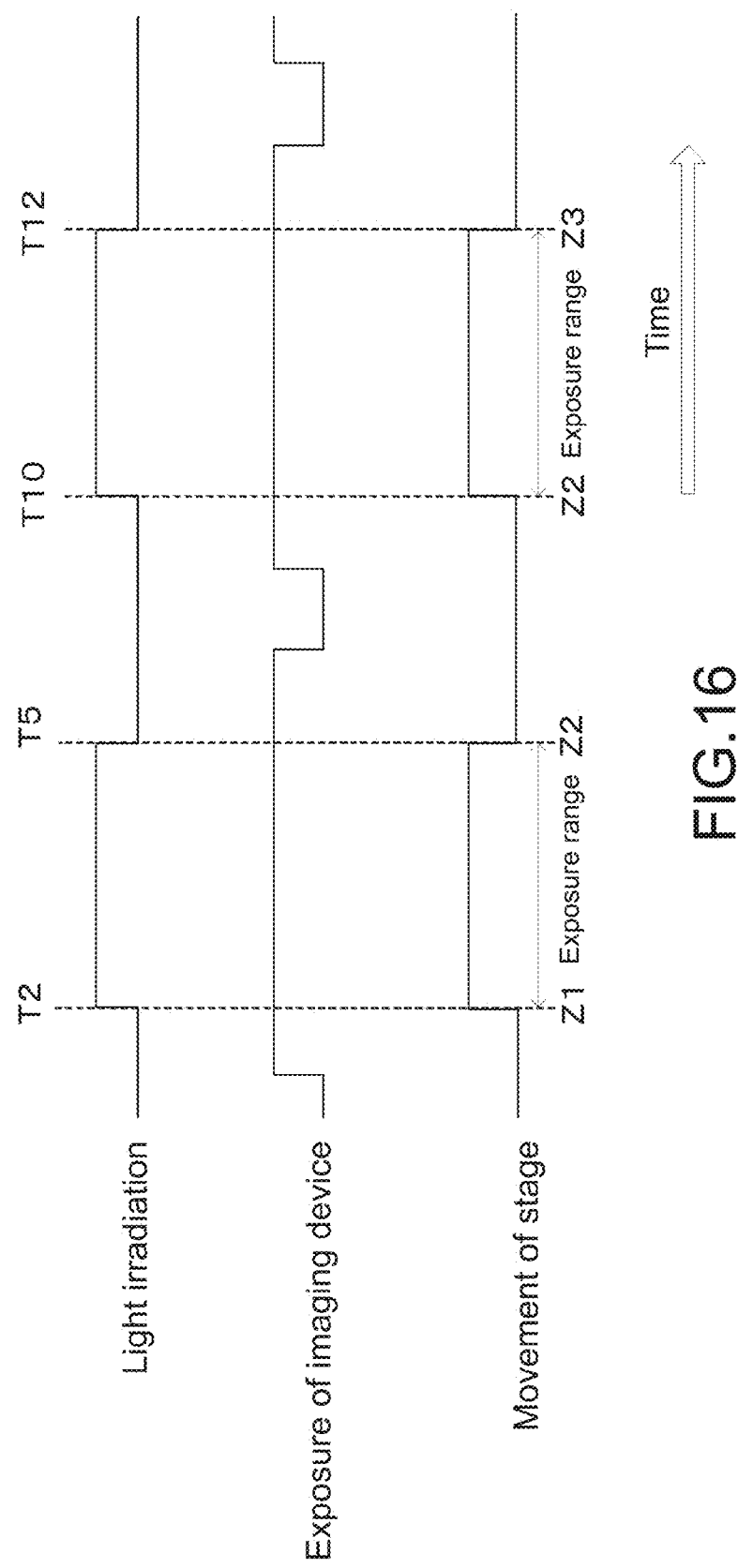

IMAGE ACQUISITION APPARATUS, IMAGE ACQUISITION METHOD, AND COMPUTER PROGRAM

CROSS REFERENCES TO RELATED APPLICATIONS

The present application claims priority to Japanese Priority Patent Application JP 2011-220773 filed in the Japan Patent Office on Oct. 5, 2011, the entire content of which is hereby incorporated by reference.

BACKGROUND

The present disclosure relates to an image acquisition apparatus that acquires an image by using a microscope, and to an image acquisition method and a computer program.

In a pathological diagnosis, a high-definition image of a biological sample is used. Such a high-definition image is obtained by magnifying a biological sample such as a tissue slice at a predetermined magnification. In this regard, there is proposed a microscope apparatus that divides an area in which a biological sample is present into a plurality of small areas, magnifies the plurality of small areas at a predetermined magnification and then images the areas to acquire divisional images, and couples the plurality of divisional images to one another to generate a high-definition image of the biological sample.

Further, a certain area of the biological sample is imaged at a plurality of focal positions at intervals of several μm, and the images thus obtained are visualized. A set of images captured by the microscope under conditions of different focal positions is called a "Z stack" (see, for example, Japanese Patent Application Laid-open No. 2008-500643).

SUMMARY

For example, when a biological sample with a thickness of 10 μm is imaged at 1-μm intervals between focal positions, imaging has to be performed ten times. In other words, ten images are acquired for one small area. In addition, in the case where an optical system with a focal depth of 1 μm is adopted, there is a fear that an observation target may be overlooked when the intervals are about 1 μm. For such a reason, there are many opinions that proper intervals are 0.5 μm or smaller. However, as the intervals between focal positions become short, a total size of image data that constitutes one Z stack increases. Furthermore, a total size of data corresponding one biological sample becomes huge. This leads to bothersome maintenance management due to a shorter replacement cycle of a storage such as an HDD (Hard Disk Drive) included in a microscope apparatus that stores image data captured by the apparatus and leads to a reduction in imaging speed due to bottlenecks such as data transmission from the microscope apparatus to an image data storage apparatus and development processing.

In view of the circumstances as described above, it is desirable to provide an image acquisition apparatus, an image acquisition method, and a computer program that are capable of improving efficiency and convenience of a user.

According to an embodiment of the present disclosure, there is provided an image acquisition apparatus including: an optical system including an objective lens for magnifying a portion of an imaging target; an imaging device that is capable of performing all-pixel simultaneous exposure and is configured to image the portion magnified by the optical system; a movement controller configured to move a focal point of the objective lens in a thickness direction of the portion of the imaging target; and a multiple exposure processing unit configured to perform multiple exposure of the imaging device at a plurality of positions such that, for each of ranges sectioned by positions in a direction in which the focal point is movable, an average image that covers each of the ranges is obtained.

The range may have a length equal to or smaller than a value obtained by multiplying a focal depth of the optical system by a multiple number of the exposure.

The multiple exposure processing unit may perform multiple exposure of the imaging device with the focal position of the objective lens being moved.

The multiple exposure processing unit may successively expose the imaging device across the plurality of positions.

The plurality of positions successively exposed in each of the ranges may be successively located in each of the ranges.

According to another embodiment of the present disclosure, there is provided an image acquisition method including: moving, by a movement controller, a focal point of an objective lens in a thickness direction of a portion of an observation target; and performing, by a multiple exposure processing unit, multiple exposure of an imaging device at a plurality of positions such that, in each of ranges sectioned by positions in a direction in which the focal point is movable, an average image that covers each of the ranges is obtained.

According to still another embodiment of the present disclosure, there is provided a program causing a computer that controls a microscope including an optical system including an objective lens for magnifying a portion of an imaging target, and an imaging device that is capable of performing all-pixel simultaneous exposure and is configured to image the portion magnified by the optical system, to operate as: a movement controller configured to move a focal point of the objective lens in a thickness direction of the portion of the imaging target; and a multiple exposure processing unit configured to perform multiple exposure of the imaging device at a plurality of positions such that, in each of ranges sectioned by positions in a direction in which the focal point is movable, an average image that covers each of the ranges is obtained.

As described above, according to the present disclosure, it is possible to improve efficiency and convenience of a user.

Additional features and advantages are described herein, and will be apparent from the following Detailed Description and the figures.

BRIEF DESCRIPTION OF THE FIGURES

FIG. 16 is a timing chart of Modified example 4, showing operations at a time of Z-stack imaging.

DETAILED DESCRIPTION

Hereinafter, an embodiment of the present disclosure will be described with reference to the drawings.
(First Embodiment)
(1. Outline of Image Acquisition Apparatus According to this Embodiment)

Figure 1:
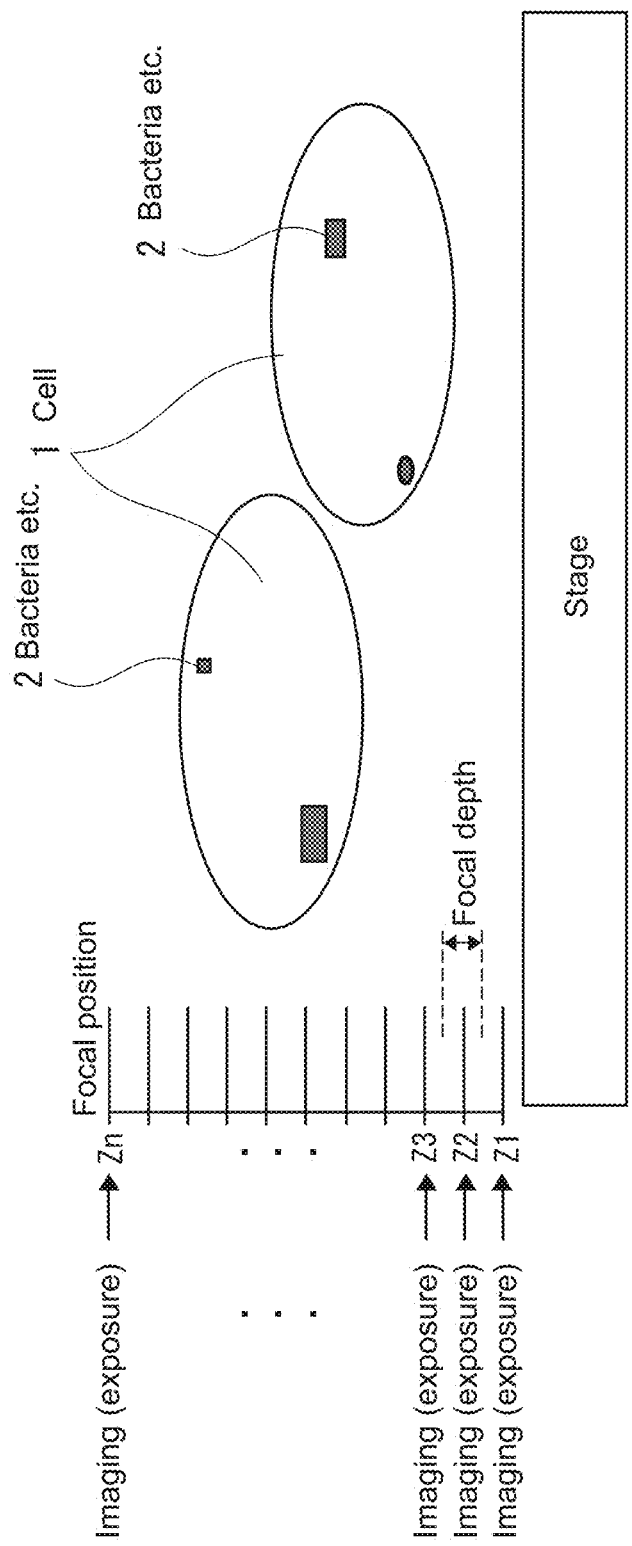
FIG. 1 is a diagram showing a typical Z-stack imaging method.

FIG. 1 is a diagram showing a typical Z-stack imaging method.

For example, in an examination of a thick biological sample such as a cell smear slide, images thereof are captured at a plurality of focal positions (Z1, Z2, . . . Zn) such that observation targets such as bacteria 2 that may be present in cells 1 can be found without being overlooked. Such a plurality of images captured at the plurality of focal positions are collectively called a "Z stack".

Meanwhile, an objective lens having a numerical aperture as high as possible (for example, NA=0.6 to 0.8) is used in an optical system of a microscope. A focal depth of the optical system using the objective lens having such a range of the numerical aperture is about 1 µm. In this case, a Z stack in which the entire biological sample is three-dimensionally covered without duplication can be obtained in theory by setting the intervals between the images in the Z stack to 1 µm. To perform an observation with less overlooked portions, however, it is desirable to generate images captured at shorter intervals, e.g., at intervals of 0.5 µm.

However, as the intervals between the images in the Z stack become short, the number of images in the Z stack increases, and accordingly the entire data size thereof becomes huge. If the data size in the unit of Z stack increases, it takes long time to acquire images, and an increase in cost is caused for storage that stores images and for maintenance management including replacement of the storage and the like.

Figure 2:
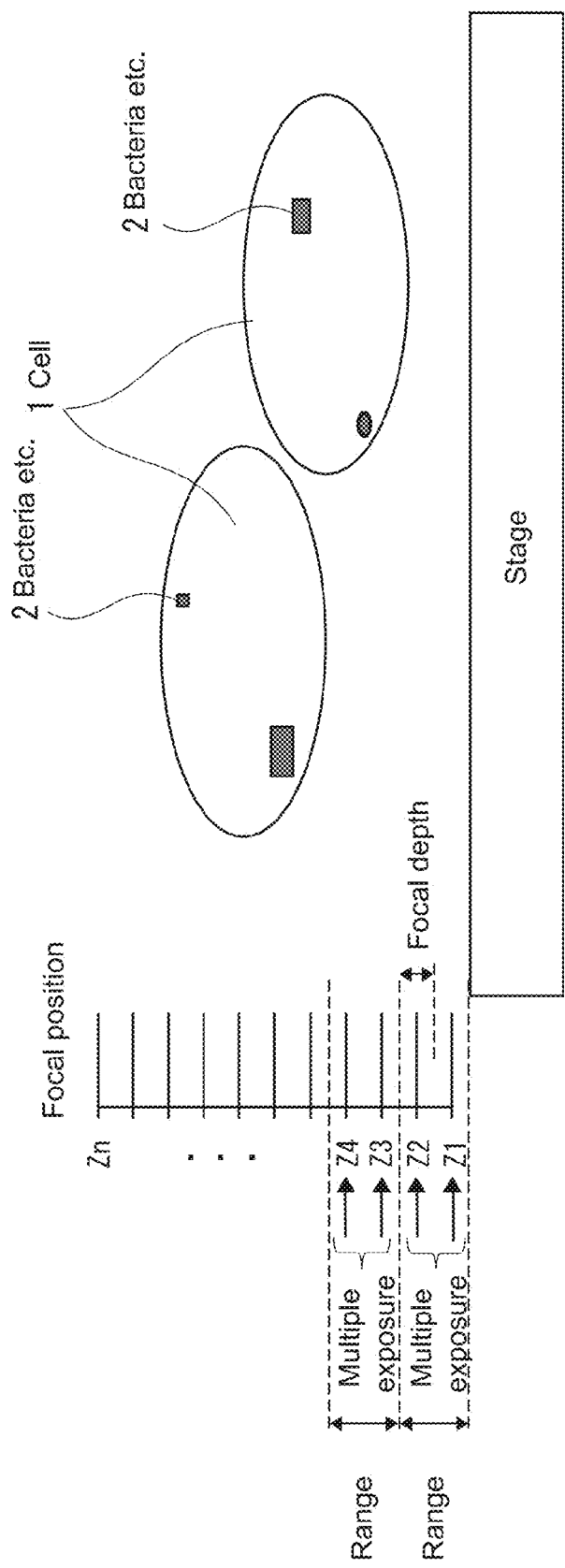
FIG. 2 is a diagram showing an imaging method according to an embodiment of the present disclosure.

The image acquisition apparatus according to this embodiment is configured to perform multiple exposure of an imaging device at a plurality of positions such that an average image that covers each of ranges, which are sectioned by positions in a direction in which a focal point is movable, may be obtained as shown in FIG. 2, for example. Here, the length of the range is set to a length obtained by multiplying the focal depth of the optical system using the objective lens by a multiple number of exposure, or to be shorter than the length.

More specifically, the image acquisition apparatus according to this embodiment performs, for example, multiple exposure of the imaging device at a plurality of successive focal positions out of the plurality of focal positions (Z1, Z2, . . . Zn) that are preset with reference to the focal depth of the objective lens using the optical system or successively performs exposure of the imaging device across the plurality of successive focal positions, to thereby acquire an average image. Accordingly, a Z stack in which an observation target is entirely imaged is obtained with reduction in the number of images in the Z stack.

Hereinbelow, the image acquisition apparatus according to this embodiment will be described in detail.

It should be noted that the image acquisition apparatus that acquires the average image described above by performing multiple exposure of the imaging device at two successive focal positions will be described in this embodiment.
(2. Structure of Image Acquisition Apparatus)

Figure 3:
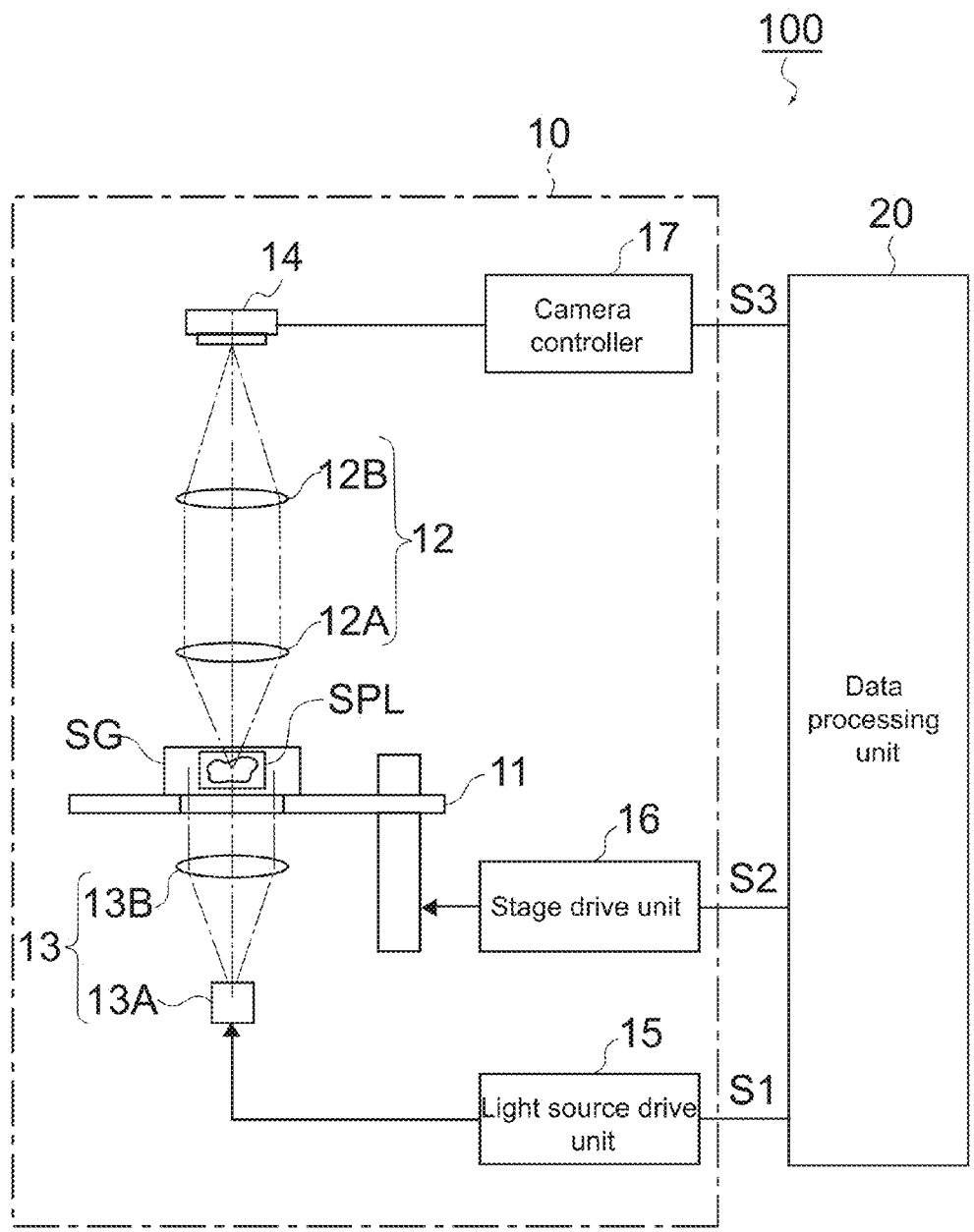
FIG. 3 is a block diagram showing a structure of an image acquisition apparatus according to a first embodiment of the present disclosure.

FIG. 3 is a diagram showing a structure of an image acquisition apparatus 100 according to this embodiment.

The image acquisition apparatus 100 includes a microscope 10 and a data processing unit 20.

The microscope 10 includes a stage 11, an optical system 12, a light source unit 13, an imaging device 14, a light source drive unit 15, a stage drive unit 16, and a camera controller 17.

The stage 11 has a surface on which a biological sample SPL as an imaging target, such as a piece of tissue, a cell, or a chromosome, is placed. The stage 11 is configured to be movable in a direction parallel to the surface (x- and y-axis directions) and a direction perpendicular to the surface (z-axis direction).

It should be noted that the biological sample SPL is fixed to a glass slide SG by a predetermined fixing technique and is stained as appropriate in this embodiment. This staining includes not only general staining techniques typified by HE (Hematoxylin-Eosin) staining, Giemsa staining, Papanicolaou staining, and the like but also fluorescence staining techniques including FISH (Fluorescence In-Situ Hybridization), an Enzyme labeled antibody method, and the like.

The optical system 12 is arranged on one side of the stage 11, and the light source unit 13 is arranged on the other side of the stage 11.

The light source unit 13 emits light under the control of the light source drive unit 15 to apply the light to the biological sample SPL placed on one surface of the stage 11 through an opening provided so as to pass through the stage 11. The light source unit 13 includes, for example, white LEDs (Light Emitting Diodes) that emit white light and serve as a light source 13A. The light source unit 13 includes a condenser lens 13B that converts light emitted from the light source 13A into substantially parallel light and uses the light as illumination light for the biological sample SPL.

The optical system 12 magnifies an image of a part of the biological sample SPL, which is obtained by the illumination light, to a predetermined magnification through an objective lens 12A and an imaging lens 12B. The image magnified through the objective lens 12A and the imaging lens 12B is formed on an imaging surface of the imaging device 14. Imaging devices capable of simultaneous exposure of all light-emitting units corresponding to all pixels, such as a CCD (Charge Coupled Device) image sensor and a CMOS (Complementary Metal-Oxide Semiconductor) image sensor, are used as the imaging device 14.

The light source drive unit 15 includes at least a drive circuit that supplies a constant drive current to the light source 13A of the light source unit 13 based on a strobe emission command 51 from the data processing unit 20 and causes the light source 13A to emit light.

The stage drive unit 16 supplies stage drive currents of three x-, y-, and z-axis directions for driving the stage 11 based on a stage control signal S2 from the data processing unit 20 and moves the stage 11 in the three axis directions.

The camera controller 17 controls the imaging device 14 based on an exposure control signal S3 from the data processing unit 20. The camera controller 17 performs A/D (Analog to Digital) conversion on signals corresponding to pixels read from the imaging device 14 (raw data) and supplies the signals thus obtained to the data processing unit 20.

The data processing unit 20 performs development processing of the raw data supplied from the camera controller 17 of the microscope 10, stitching processing of the developed data, and the like to generate a biological sample image, and encodes this biological sample image into data in a predetermined compression form such as JPEG (Joint Photographic Experts Group) for storage. Further, the data processing unit 20 executes computation processing for controlling the light source drive unit 15, the stage drive unit 16, and the camera controller 17 based on predetermined programs.

(3. Structure of Data Processing Unit)

Next, the structure of the data processing unit 20 will be described.

Figure 4:
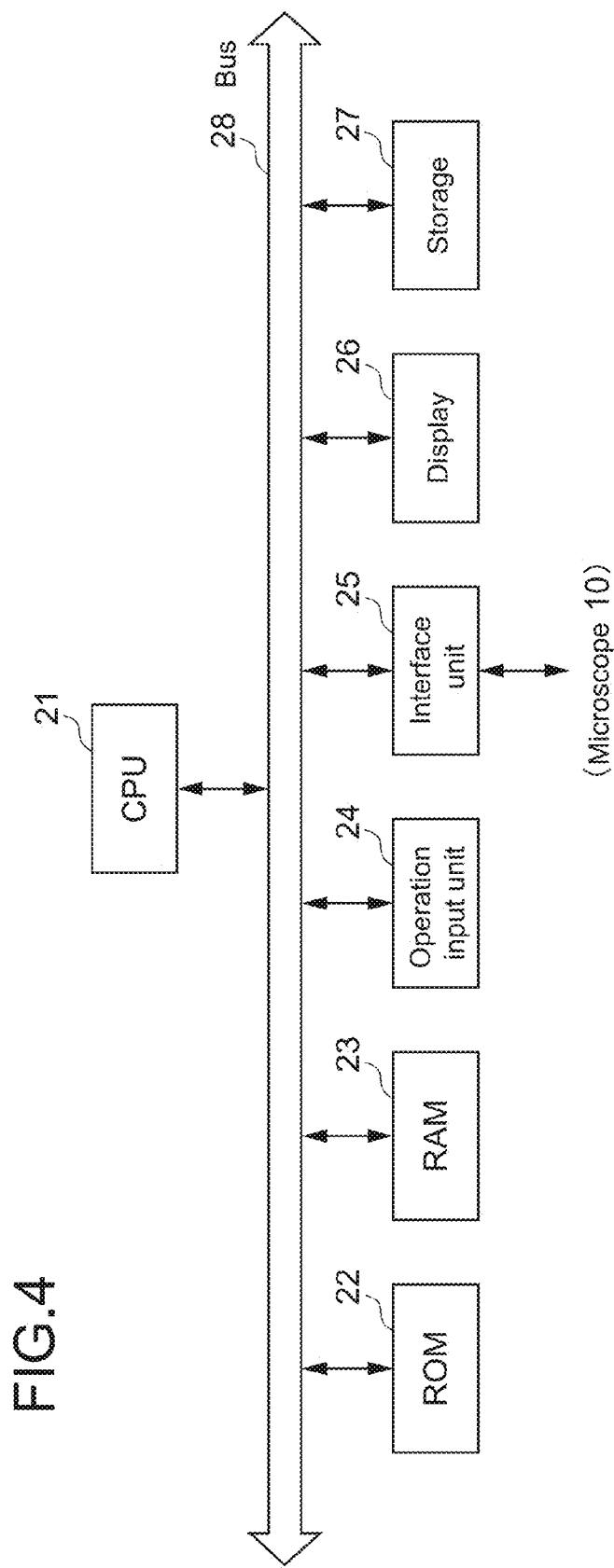
FIG. 4 is a block diagram showing a hardware structure of a data processing unit in the image acquisition apparatus shown in FIG. 3.

FIG. 4 is a block diagram showing a hardware structure of the data processing unit 20.

The data processing unit 20 includes a CPU (Central Processing Unit) 21 that performs computation control, a ROM (Read Only Memory) 22, a RAM (Random Access Memory) 23 to be a work memory of the CPU 21, an operation input unit 24 that inputs a command corresponding to an operation of a user, an interface unit 25, a display 26, a storage 27, and a bus 28 that connects those components to one another.

The ROM 22 stores programs for executing various types of processing. The interface unit 25 is connected with the microscope 10.

A liquid crystal display, an EL (Electro Luminescence) display, a plasma display, or the like is applied to the display 26. An optical disc, a semiconductor memory, or a magnetic disc typified by an HDD (Hard Disk Drive) is applied to the storage 27.

The CPU 21 develops, out of a plurality of programs stored in the ROM 22, a program corresponding to a command given by the operation input unit 24 in the RAM 23 and controls the display 26 and the storage 27 as appropriate according to the developed program. Further, the CPU 21 controls the units of the microscope 10 as appropriate through the interface unit 25 according to the program developed in the RAM 23.

(4. Acquisition Processing for Biological Sample Image)

Next, acquisition processing for a biological sample image in the image acquisition apparatus 100 according to this embodiment will be described.

When receiving a command to acquire an image of the biological sample SPL from the operation input unit 24, the CPU 21 develops a program corresponding to the acquisition command in the RAM 23.

Figure 5:
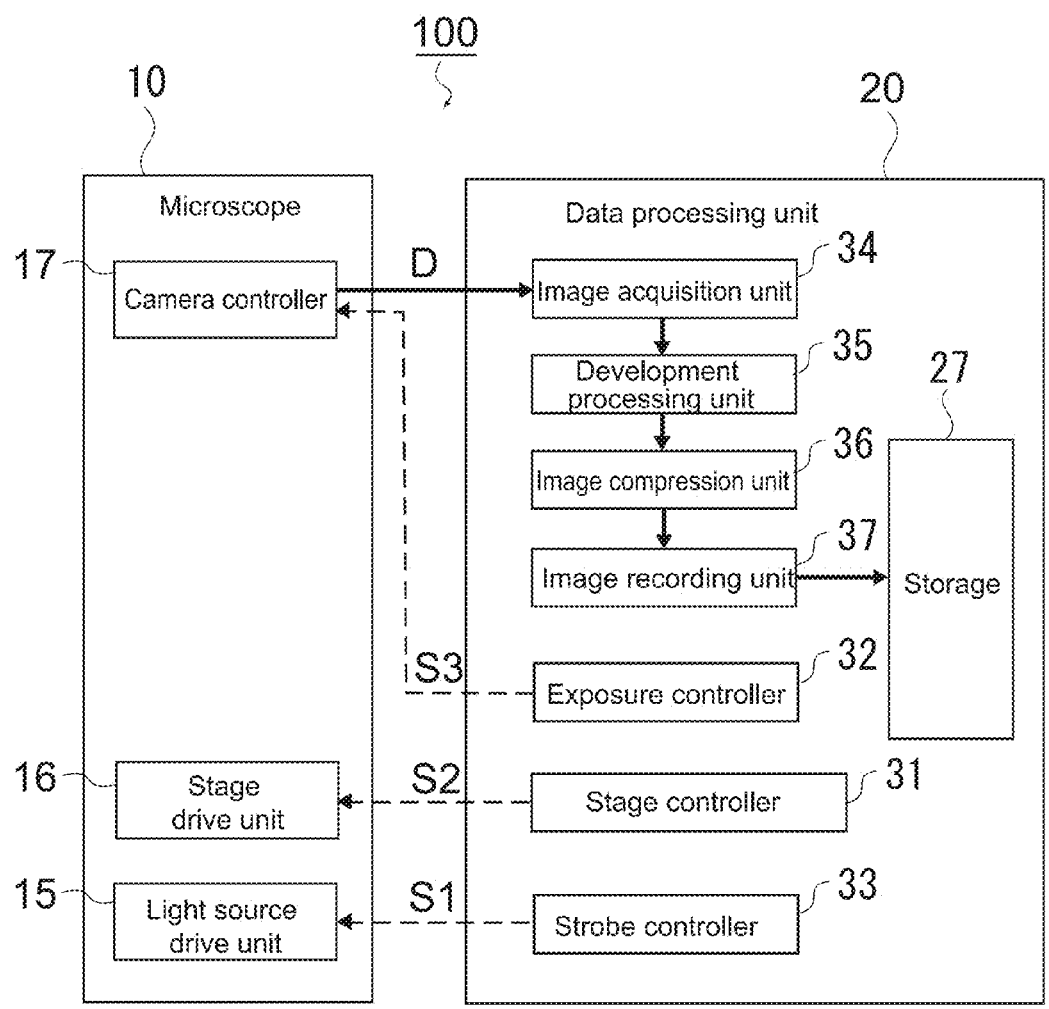
FIG. 5 is a block diagram showing a functional structure of the data processing unit shown in FIG. 4.

The CPU 21 functions as a stage controller 31 (movement controller), an exposure controller 32 (multiple exposure processing unit), a strobe controller 33 (multiple exposure processing unit), an image acquisition unit 34, a development processing unit 35, an image compression unit 36, and an image recording unit 37 according to the program corresponding to the acquisition command for an image of the biological sample SPL, as shown in FIG. 5.

Figure 6:
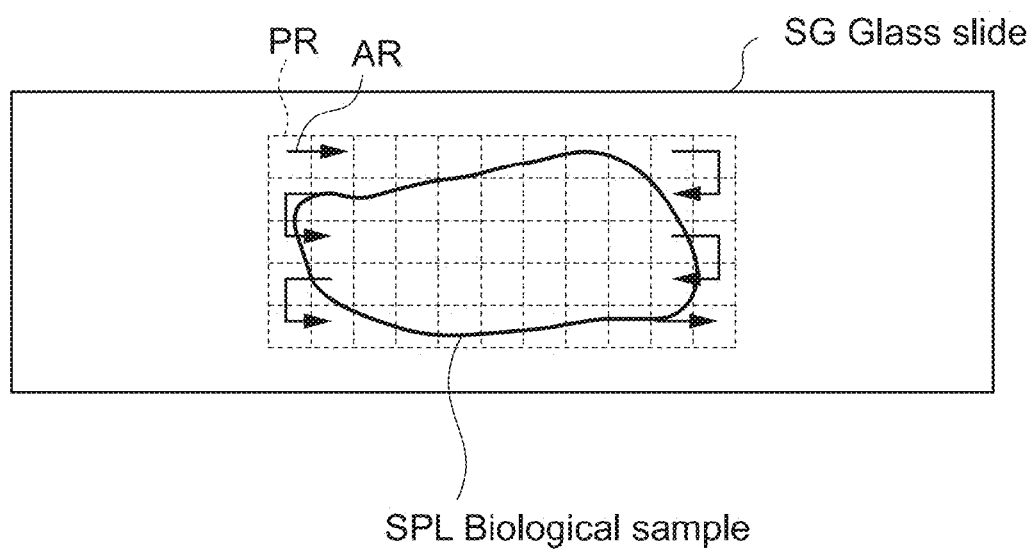
FIG. 6 is a diagram showing an area to be imaged by the image acquisition apparatus shown in FIG. 3.

For example, as shown in FIG. 6, the stage controller 31 allocates a plurality of small areas AR to an area to be imaged (hereinafter, also referred to as sample area) PR of the biological sample SPL in accordance with a magnification of the objective lens 12A and the imaging lens 12B.

The stage controller 31 moves the stage 11 such that an area to be imaged by the imaging device 14 is located in, for example, a small area AR on the upper left out of the small areas AR.

After that, as shown in FIG. 6, the processing for acquiring as a Z stack a plurality of images at a plurality of focal positions (Z1, Z2, ... Zn) is executed for the small area AR located on the upper left as follows. It should be noted that the plurality of focal positions (Z1, Z2, ... Zn) are determined with reference to the focal depth of the optical system using the objective lens. In this embodiment, the intervals between the focal positions are set to be the same as the focal depth of the optical system 12 including the objective lens 12A. However, the intervals between the focal positions only need to be set to the focal depth of the optical system or less in the present disclosure.

Figure 7:
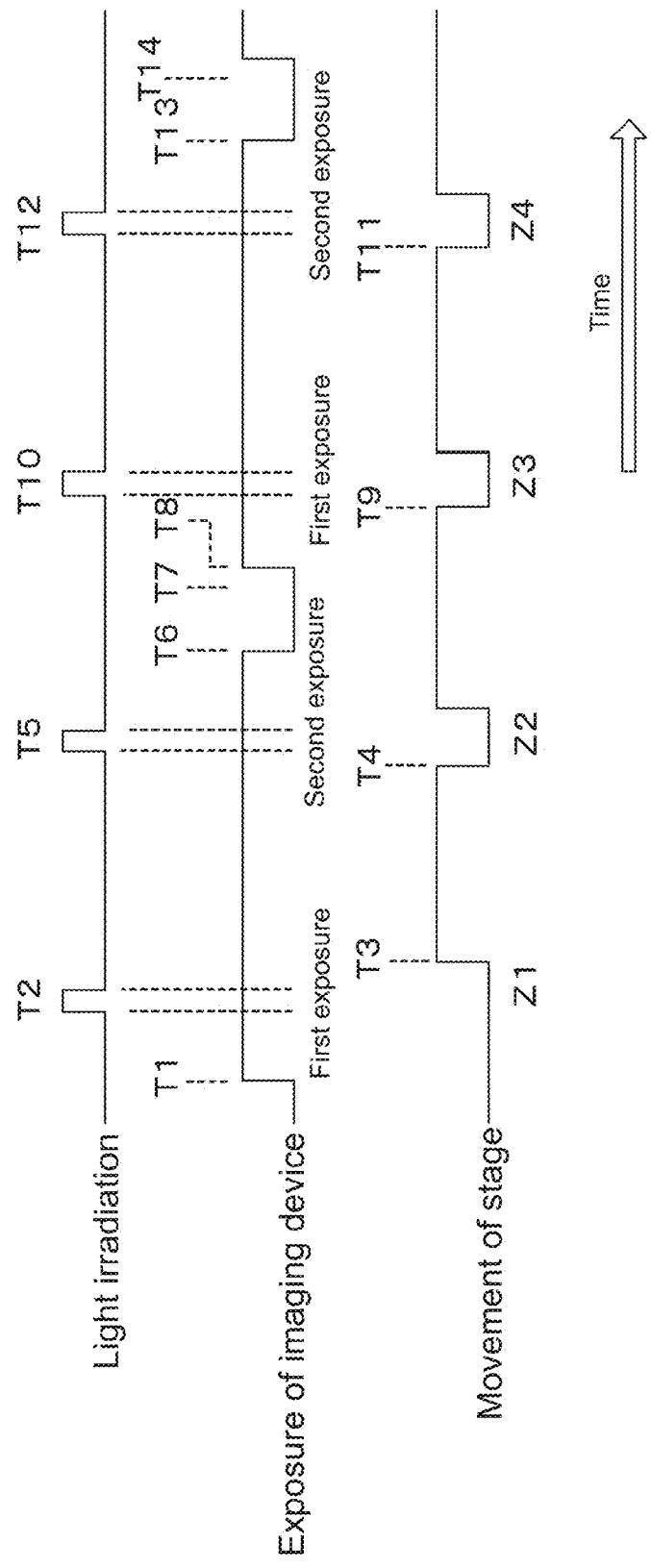
FIG. 7 is a timing chart of operations of respective units of the image acquisition apparatus shown in FIG. 3 at a time of Z-stack imaging by the image acquisition apparatus.

FIG. 7 is a timing chart of operations of the respective units of the image acquisition apparatus 100 at a time of Z-stack imaging. The timing chart shows an on/off timing of each of light irradiation, the exposure of the imaging device 14, and the movement of the stage 11 in the z-axis direction in the stated order from above.

(Multiple Exposure at Initial Two Focal Positions Z1 and Z2)

The stage controller 31 first sets a position of the stage 11 in the z-axis direction so as to form a focal point at the first focal position Z1.

The exposure controller 32 supplies the exposure control signal S3 to the camera controller 17 so that the imaging device 14 in the microscope 10 enters a state where exposure is available, which is a state where images are captured. Upon reception of the exposure control signal S3, the camera controller 17 sets the imaging device 14 to enter the state where exposure is available prior to the light irradiation by the light source unit 13 (T1).

After the imaging device 14 enters the state where exposure is available, the strobe controller 33 in the data processing unit 20 supplies the strobe emission command S1 to the light source drive unit 15 so that the light source unit 13 emits a predetermined amount of light. The all-pixel simultaneous exposure (first exposure) of the imaging device 14 at the focal position Z1 is thus performed (T2).

Here, a value of each pixel of the imaging device 14 is typically taken in by the camera controller 17 and then transmitted to the data processing unit 20. In this embodiment, however, the exposure controller 32 keeps the imaging device 14 to be in the state where exposure is available.

After the first exposure of the imaging device 14, the stage controller 31 of the data processing unit 20 supplies the stage control signal S2 to the stage drive unit 16 so as to move the focal position to the focal position Z2 (T3). When the movement of the stage 11 to the focal position Z2 is completed, the stage controller 31 stops the stage 11 (T4).

After that, the strobe controller 33 supplies the strobe emission command S1 to the light source drive unit 15 so as to cause the light source unit 13 to emit light again. The exposure (second exposure) of the imaging device 14 at the focal position Z2 is thus performed (T5).

Here, charges are already accumulated in the light-emitting units of all the pixels of the imaging device 14 due to the exposure at the focal position Z1. Therefore, by the exposure at the focal position Z2, charges obtained by photoelectric conversion at each of the two focal positions Z1 and Z2 are added for each pixel and accumulated in the light-emitting units of all the pixels of the imaging device 14. In other words, the imaging device 14 is subjected to double exposure at the two focal positions Z1 and Z2 so that the images at the two focal positions Z1 and Z2 are combined to be one average image.

After the second exposure of the imaging device 14 (exposure at focal position Z2) is completed, the exposure controller 32 supplies the exposure control signal S3 to the camera controller 17 so as to take in data of all the pixels from the imaging device 14. The camera controller 17 takes in a voltage signal corresponding to the charges accumulated in each of the light-emitting units of all the pixels of the imaging device 14 according to the exposure control signal S3 during a period of time from T6 to T7. Then, the camera controller 17 transmits the data of all the pixels, which are generated by being subjected to necessary signal processing such as A/D conversion, as image raw data, to the exposure controller 32 of the data processing unit 20. Thus, the imaging of an average image by the multiple exposure at the two focal positions Z1 and Z2 is completed.

(Multiple Exposure of Subsequent Two Focal Positions Z3 and Z4)

Subsequently, the imaging by the multiple exposure is similarly performed at subsequent two focal positions Z3 and Z4. In other words, when the images are completely captured from the imaging device 14 subjected to the multiple exposure at the previous two focal positions Z1 and Z2, the exposure controller 32 supplies the exposure control signal S3 to the camera controller 17 to cause the imaging device 14 to enter the state where exposure is available again (T8).

Upon completion of the second exposure of the imaging device 14 (exposure at focal position Z2) (T6), the stage controller 31 supplies the stage control signal S2 to the stage drive unit 16 so as to move the stage 11 to the next focal position Z3. Upon completion of the movement of the stage 11 to the next focal position Z3, the stage controller 31 stops the stage 11 (T9).

When the imaging device 14 enters the state where exposure is available and the movement of the stage 11 to the next focal position Z3 is completed, the strobe controller 33 supplies again the strobe emission command S1 to the light source drive unit 15 so as to cause the light source unit 13 to emit light. The first exposure of the imaging device 14 at the next focal position Z3 is thus performed (T10).

The exposure controller 32 keeps the imaging device 14 to be in the state where exposure is available after the light irradiation from the light source unit 13 to the biological sample SPL. Upon completion of the light emission from the light source unit 13, the stage controller 31 of the data processing unit 20 supplies the stage control signal S2 to the stage drive unit 16 so as to move the stage 11 to the next focal position Z4. When the movement of the stage 11 to the next focal position Z4 is completed, the stage controller 31 stops the stage 11 (T11).

After that, the strobe controller 33 supplies the strobe emission command S1 to the light source drive unit 15 so as to cause the light source unit 13 to emit light again. The second exposure of the imaging device 14 at the next focal position Z4 is thus performed (T12). After the second exposure of the imaging device 14 (exposure at focal position Z4) is completed, the exposure controller 32 supplies the exposure control signal S3 to the camera controller 17 so as to take in data of all the pixels from the imaging device 14. The camera controller 17 takes in a voltage signal corresponding to the charges accumulated in each of the light-emitting units of all the pixels of the imaging device 14 according to the exposure control signal S3 during a period of time from T13 to T14. Then, the camera controller 17 transmits digital data of all the pixels, which are generated by being subjected to necessary signal processing such as A/D conversion, as image raw data, to the exposure controller 32 of the data processing unit 20. Thus, the acquisition of an average image by the double exposure at the subsequent two focal positions Z3 and Z4 is completed.

Also in focal positions following the above-mentioned positions, the acquisition of an average image by the double exposure is similarly repeated.

The Z stack constituted of a plurality of average images captured as described above has a significantly smaller number of images than the Z stack obtained by a typical method of exposing an imaging device once at each of focal positions. Further, since each image is an average image obtained by the double exposure of the imaging device 14 at two focal positions, if the focal depth of the optical system using the objective lens is larger than the interval between the two focal positions, a Z stack in which an observation target is entirely imaged is obtained.

Figure 8:
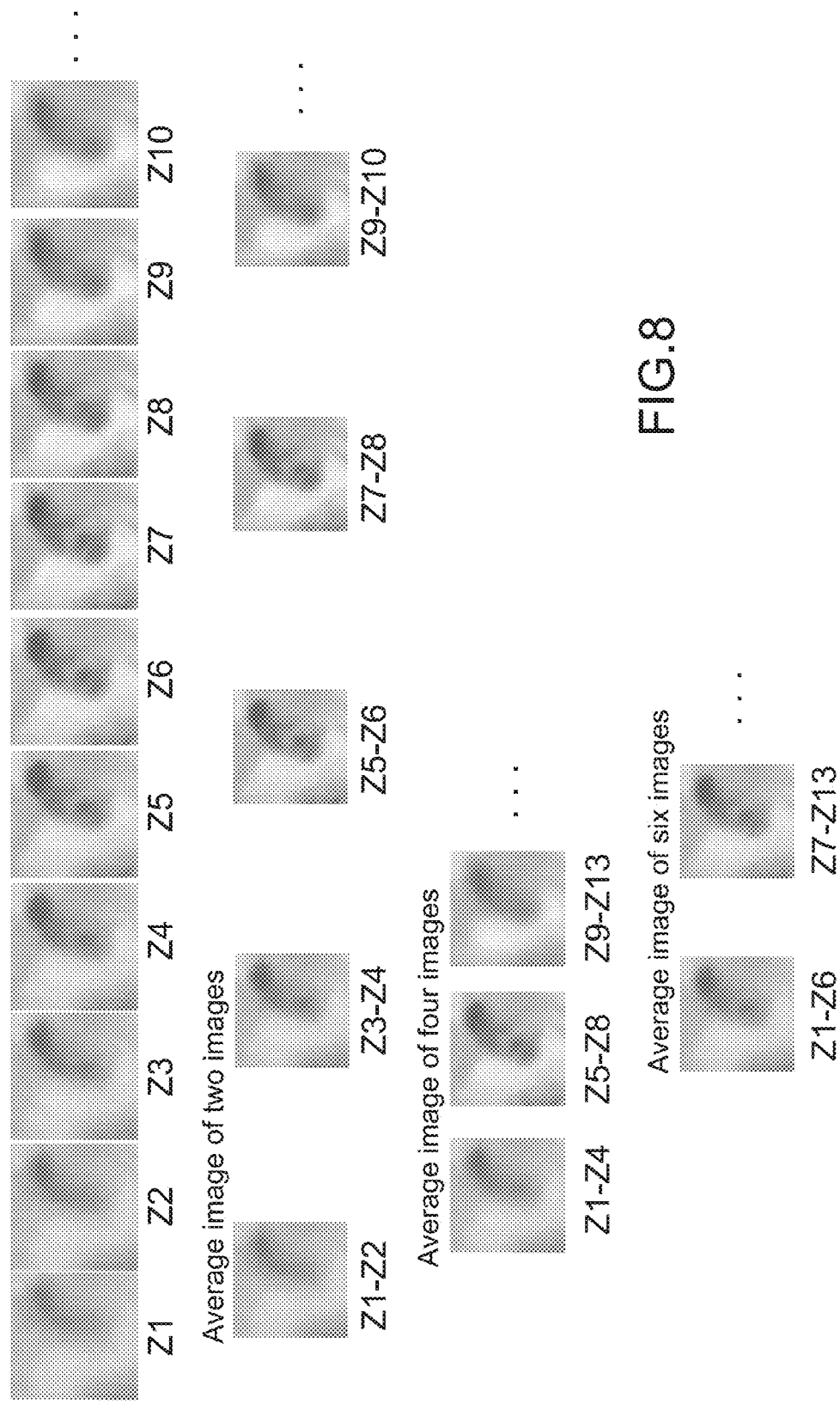
FIG. 8 is a diagram showing a Z stack acquired by the image acquisition apparatus according to the first embodiment and a typical Z stack for comparison.

FIG. 8 is a diagram showing average images acquired by the image acquisition apparatus 100 according to this embodiment and fixed focal point images in a typical Z stack for comparison.

Figure 9:
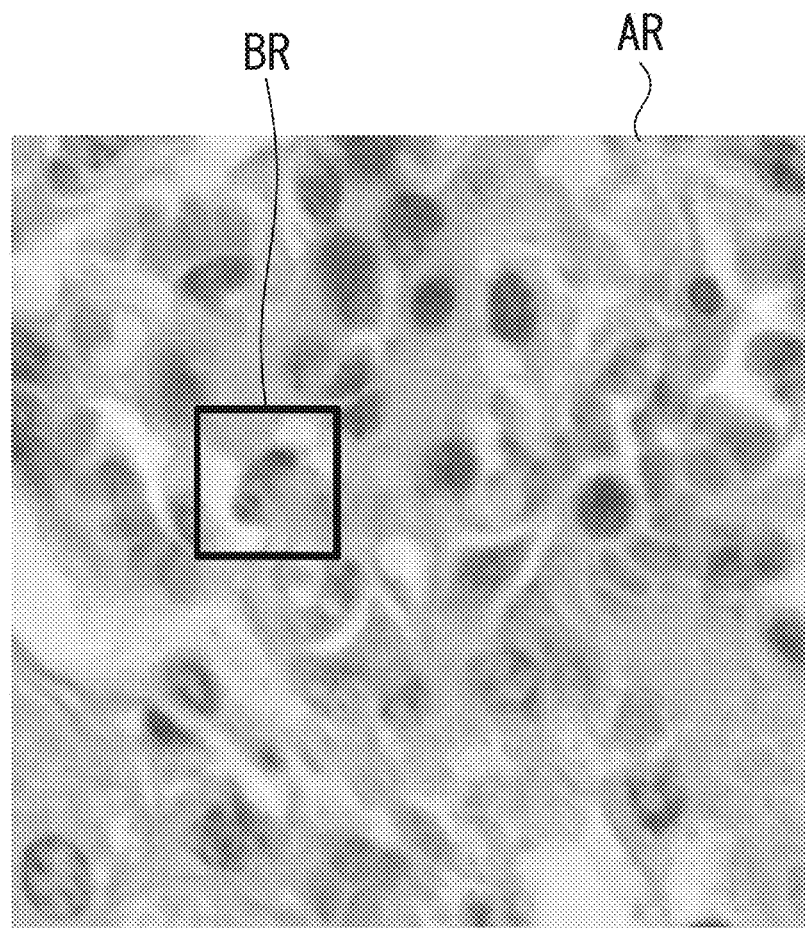
FIG. 9 is a diagram showing a relationship among a fixed focal point image of the Z stack, an average image, and the area to be imaged shown in FIG. 6.

The fixed focal point images in the typical Z stack are images obtained by imaging with imaging intervals of 0.5 μm at focal positions Z1, Z2, ..., Z10, ... (see FIG. 1). It should be noted that those fixed focal point images each correspond to a part BR of an image (small area AR of FIG. 6) captured by the imaging device 14 as shown in FIG. 9.

On the other hand, an average image Z1-Z2 is an image obtained by the double exposure at the two focal positions Z1 and Z2. An average image Z3-Z4 is an image obtained by the double exposure at the two focal positions Z3 and Z4. An average image Z5-Z6 is an image obtained by the double exposure at the two focal positions Z5 and Z6. An average image Z7-Z8 is an image obtained by the double exposure at the two focal positions Z7 and Z8. An average image Z9-Z10 is an image obtained by the double exposure at the two focal positions Z9 and Z10.

As found from the comparison between the average images and the fixed focal point images, the image quality of the average images is slightly inferior to that of the fixed focal point images corresponding thereto due to the double exposure, but it can be said that this lower image quality does not affect the observation of the biological sample.

The average images may be not only images obtained by the double exposure at the two successive focal positions Z3 and Z4, but also images obtained by multiple exposure at three focal positions or more. In FIG. 8, an average image Z1-Z4 is an image obtained by the multiple exposure at the four focal positions Z1, Z2, Z3, and Z4. An average image Z5-Z8 is an image obtained by the multiple exposure at the four focal positions Z5, Z6, Z7, and Z8. An average image Z9-Z12 is an image obtained by the multiple exposure at the four focal positions Z9, Z10, Z11, and Z12.

Figure 10:
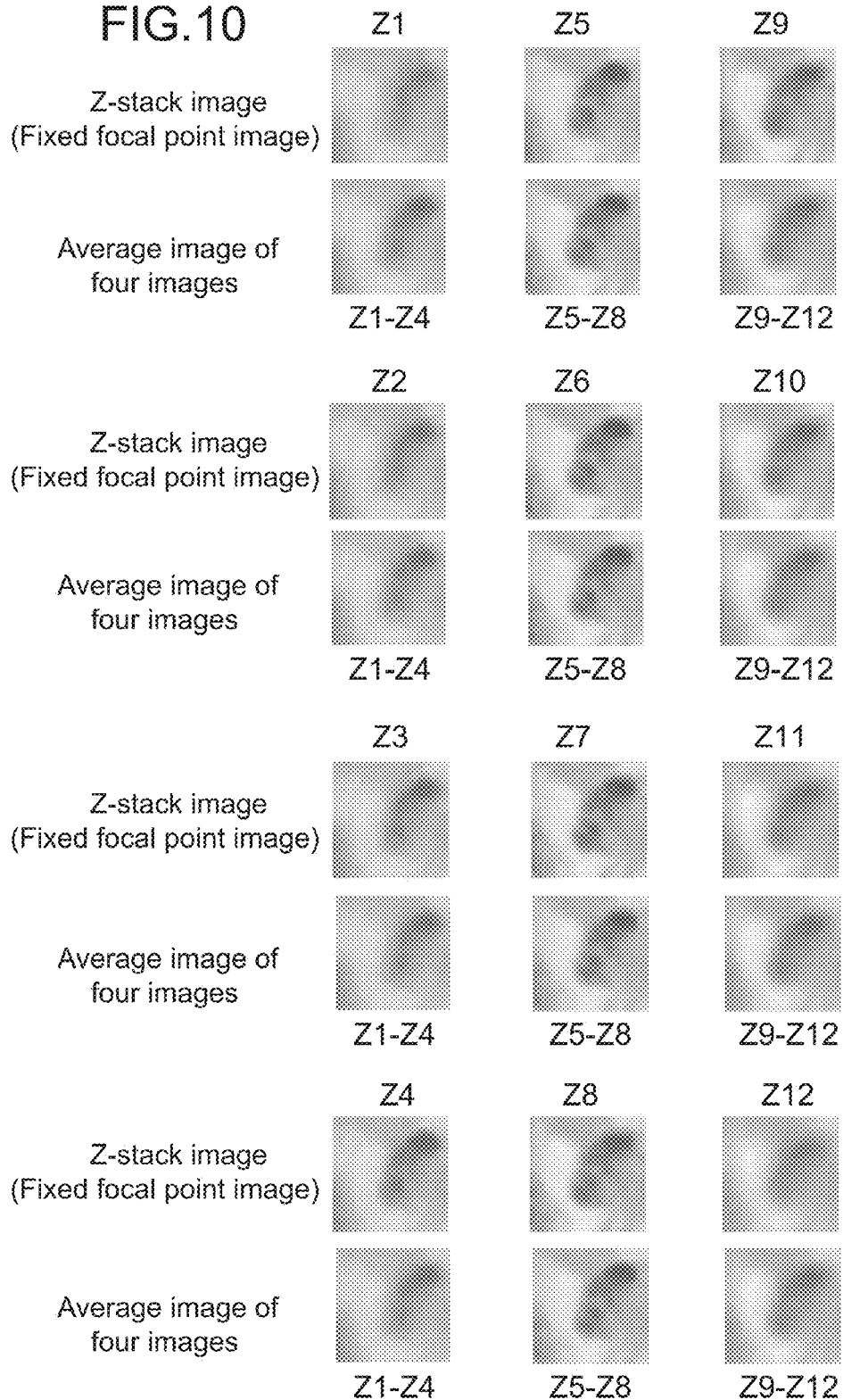
FIG. 10 is a diagram showing average images and fixed focal point images for comparison.

In this manner, it has been confirmed that such an image quality that does not affect the observation of the biological sample is obtained also for the average images obtained by the multiple exposure at the four successive focal positions. For reference, the average images obtained by the multiple exposure at the four successive focal positions are shown in FIG. 10 in comparison with the fixed focal point images at those four focal positions.

Next, the reason that the image quality of the average images obtained by the image acquisition apparatus 100 according to this embodiment is satisfactory for use in observation of a biological sample will be described.

Figure 11:
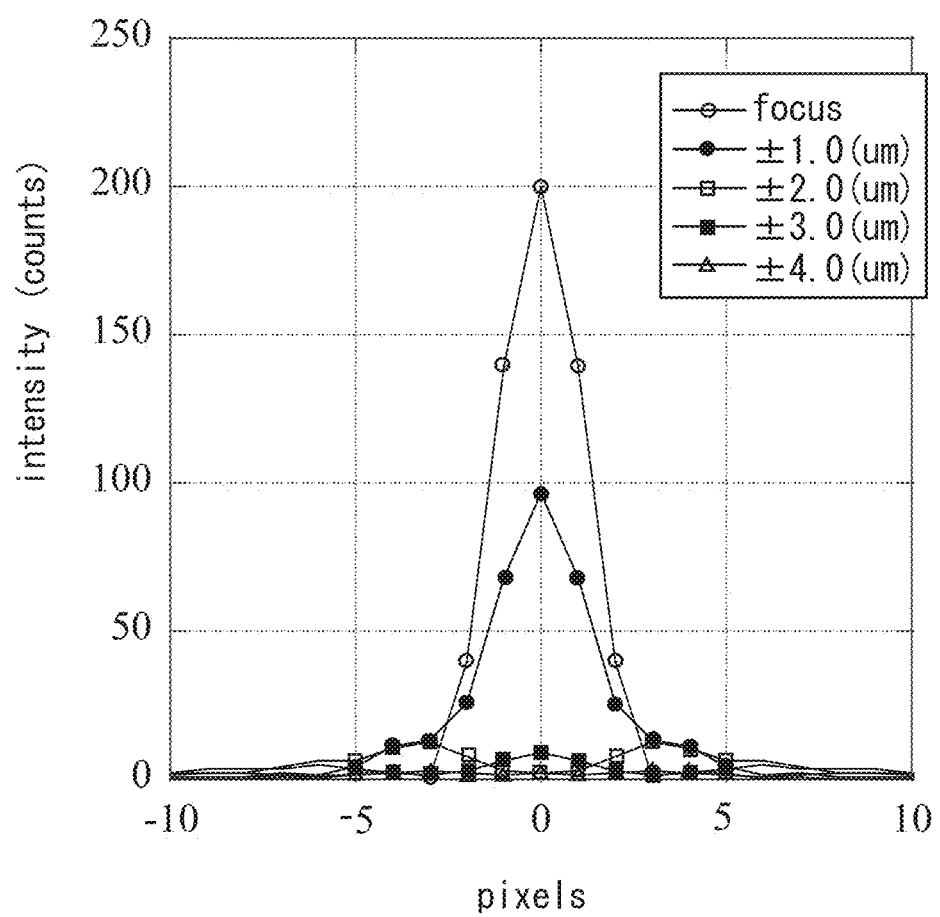
FIG. 11 is a graph showing general defocus characteristics of an image of green light with a wavelength of 540 nm.

FIG. 11 is a graph showing defocus characteristics of a bright-spot image obtained when green light with a wavelength of 540 nm, which is emitted from fine light-emitting points, is observed through an objective lens with NA of 0.8.

In this graph, the vertical axis represents a count value (intensity count) indicating an intensity of each pixel obtained by calculating information, the horizontal axis represents pixels on an imager, and a plurality of lines in the graph represent correlations between a shift amount of an optical axis and a count value for each amount of defocus. It should be noted that the count value (intensity count) is an index value of intensity (contrast). In this manner, it is found that in defocus characteristics of the image of the green light with a wavelength of 540 nm, the intensity (contrast) is sharply reduced around a point where the amount of defocus exceeds 2 µm.

Figure 12:
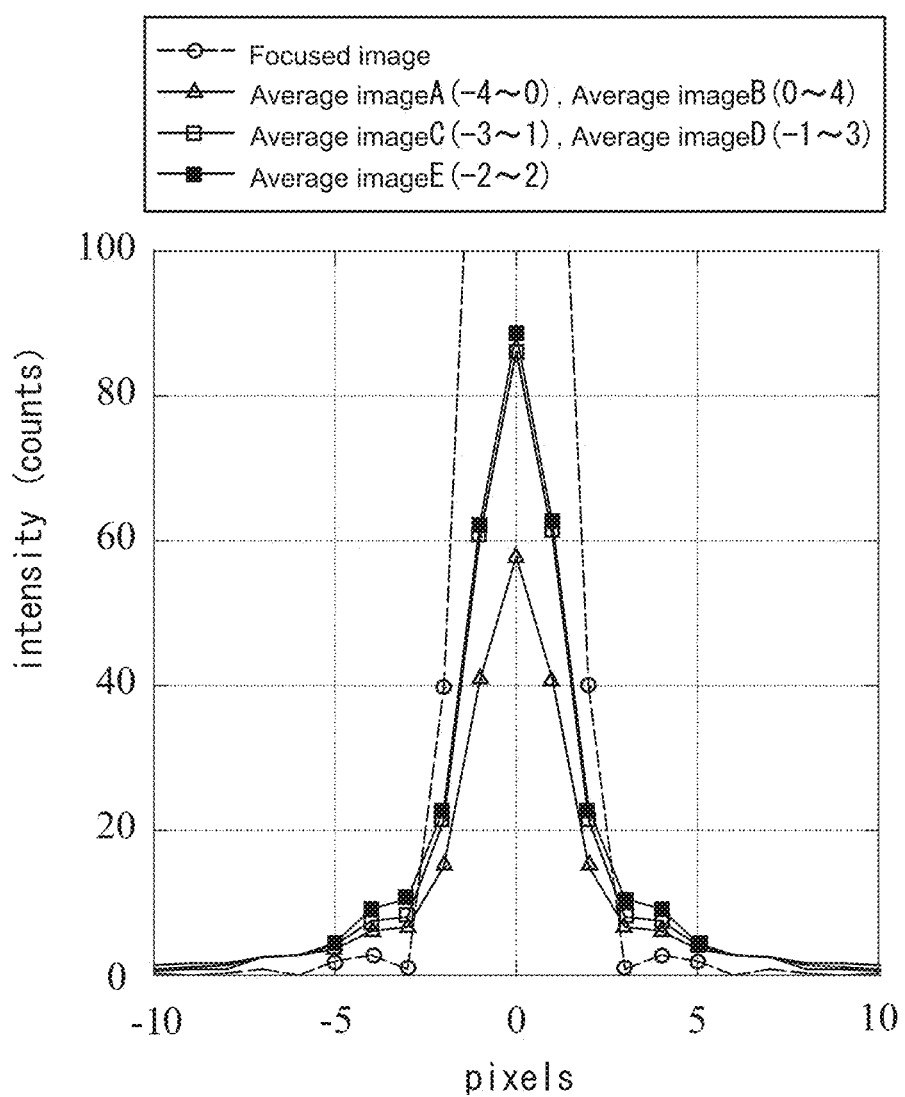
FIG. 12 is a graph showing defocus characteristics of average images in the range of 4 µm.

FIG. 12 is a graph showing defocus characteristics of average images in the range of 4 µm. Dotted lines represent defocus characteristics of fixed focal point images, and other solid lines represent defocus characteristics of average images in the range of 4 µm. Specifically, an average image A is an average image in the range from a focused position to a position 4 µm below the focused position, an average image B is an average image in the range from the focused position to a position 4 µm above the focused position, an average image C is an average image in the range from a position 3 µm below the focused position to a position 1 µm above the focused position, an average image D is an average image in the range from a position 1 µm below the focused position to a position 3 µm above the focused position, and an average image E is an average image in the range from a position 2 µm above the focused position to a position 2 µm below the focused position. The defocus characteristics of the average image A and those of the average image B are substantially the same, and therefore they are represented by one solid line. Similarly, the defocus characteristics of the average image C and those of the average image D are substantially the same, and therefore they are represented by one solid line.

Comparing FIG. 11 and FIG. 12, the intensity (contrast) of the average image in the range of 4 µm is similar to that when the amount of defocus is 1 µm, which is satisfactory for use in observation of a biological sample.

As described above, with the image acquisition apparatus 100 according to this embodiment, a Z stack including a smaller number of images, in which an observation target is entirely imaged, is obtained while practically ensuring a satisfactory image quality. Accordingly, a replacement cycle of a storage such as an HDD (Hard Disk Drive) included in an apparatus that stores data of captured images is prolonged, and bothersome maintenance management is reduced. In addition, an image acquisition speed is improved.

MODIFIED EXAMPLE 1

Next, Modified examples of the embodiment described above will be described.

Figure 13:
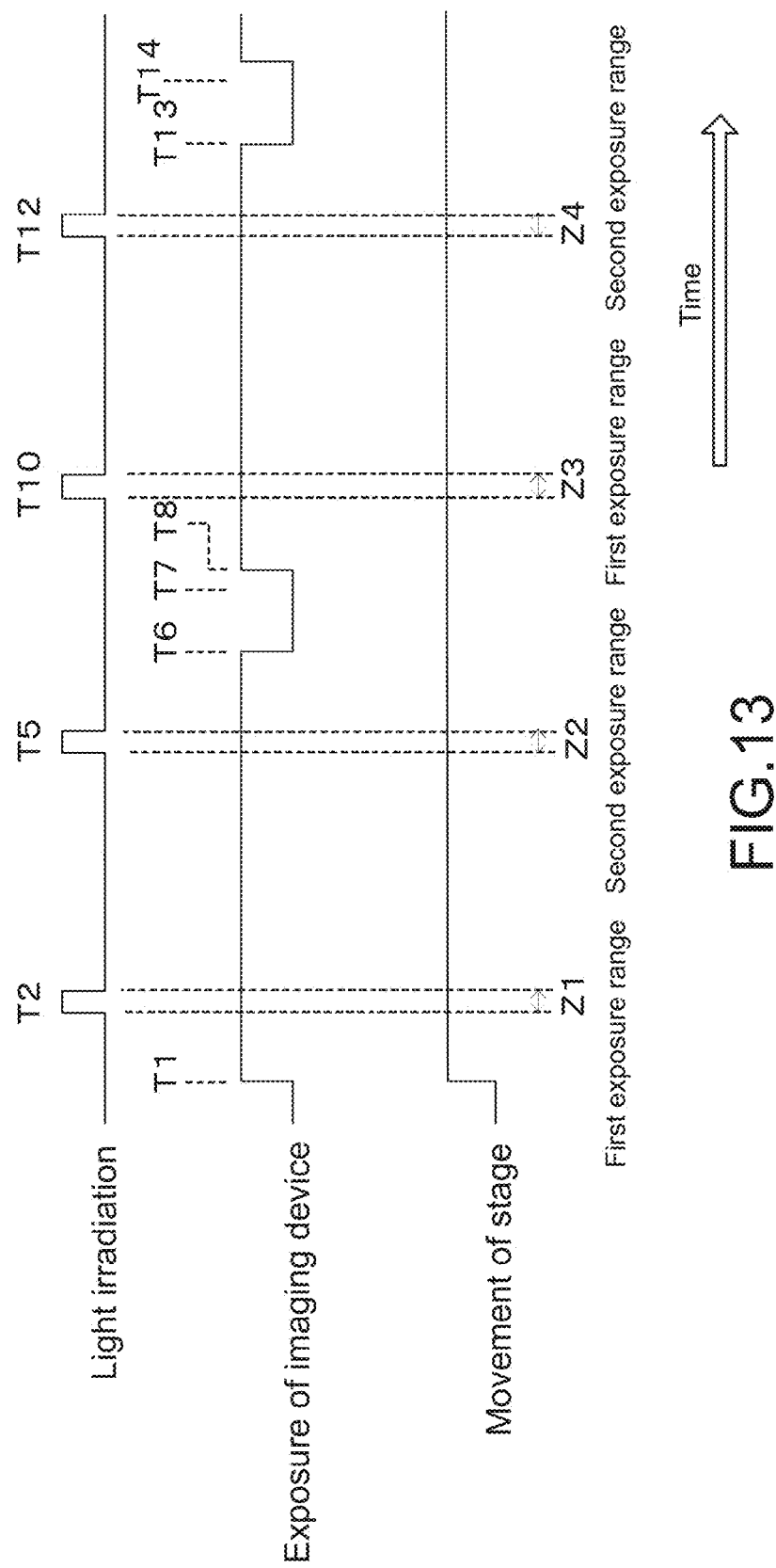
FIG. 13 is a timing chart of Modified example 1, showing operations at a time of Z-stack imaging.

FIG. 13 is a timing chart of Modified example 1, showing operations at a time of Z-stack imaging.

An image acquisition apparatus in Modified example 1 is configured to successively move the stage 11, that is, successively change the focal position in a Z-stack imaging operation by the image acquisition apparatus 100 according to the embodiment described above. A movement speed of the stage 11 is desirably constant during at least the exposure.

By this method, a time for setting the stage 11 to be static is omitted, with the result that the time for the Z-stack imaging is shortened as a whole. It should be noted that the operation of the image acquisition apparatus of Modified example 1 is basically the same as that of the image acquisition apparatus 100 according to the embodiment described above except that the stage 11 is not stopped. An effect of the embodiment described above can also be produced by Modified example 1.

MODIFIED EXAMPLE 2

Figure 14:
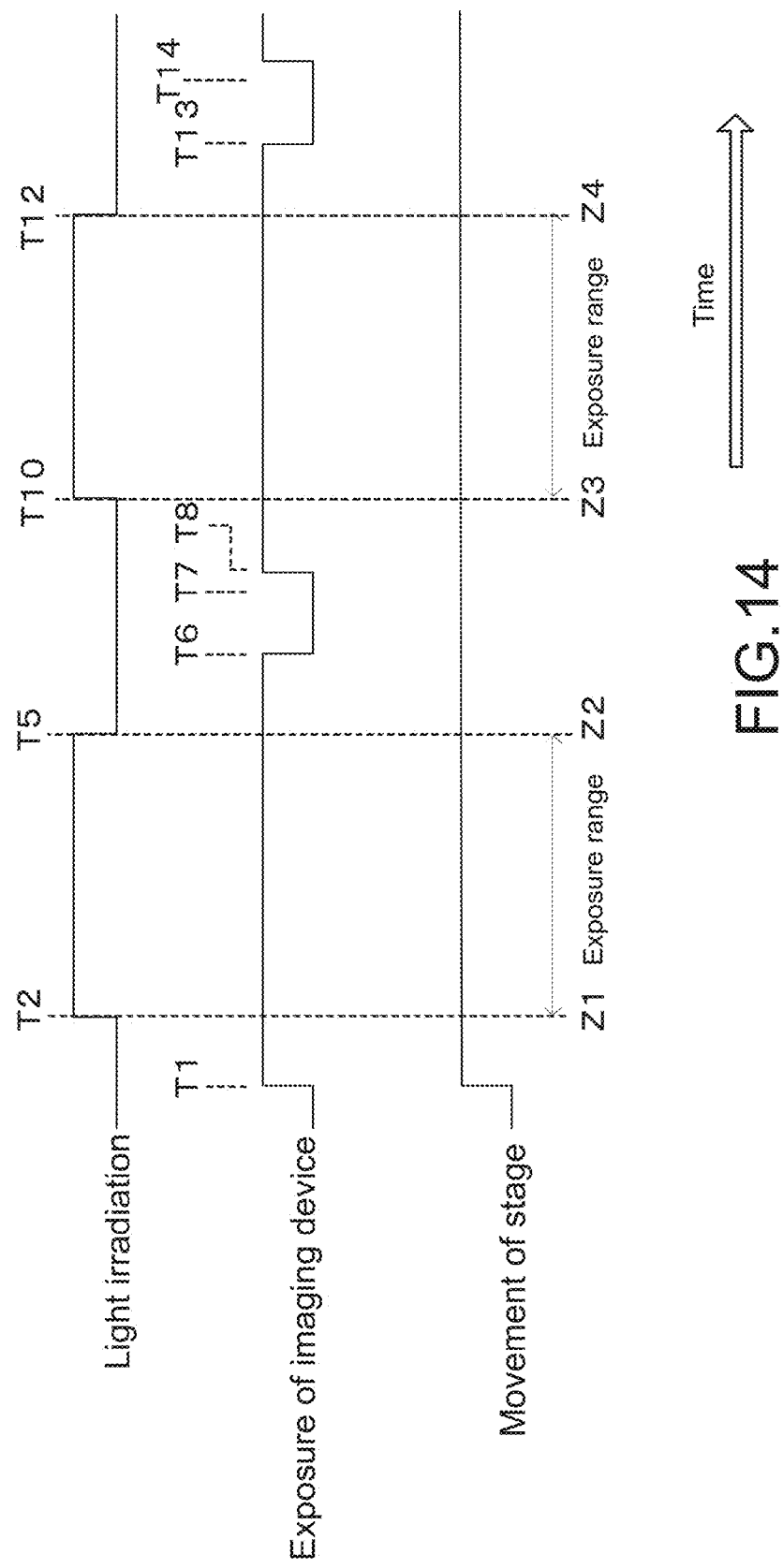
FIG. 14 is a timing chart of Modified example 2, showing operations at a time of Z-stack imaging.

FIG. 14 is a timing chart of Modified example 2, showing operations at a time of Z-stack imaging.

An image acquisition apparatus in Modified example 2 is configured to set a light irradiation timing so as to successively expose the imaging device 14 across a plurality of successive focal positions, in addition to successively moving the stage 11. Other operations of the image acquisition apparatus in Modified example 2 are basically the same as those of the image acquisition apparatus in Modified example 1. An effect of the embodiment described above can also be produced by Modified example 2. Further, by the successive exposure of the imaging device 14 across the successive focal positions, a possibility that a part of the observation target may be overlooked and remain not to be imaged is further reduced, as compared to Modified example 1 described above.

MODIFIED EXAMPLE 3

Figure 15:
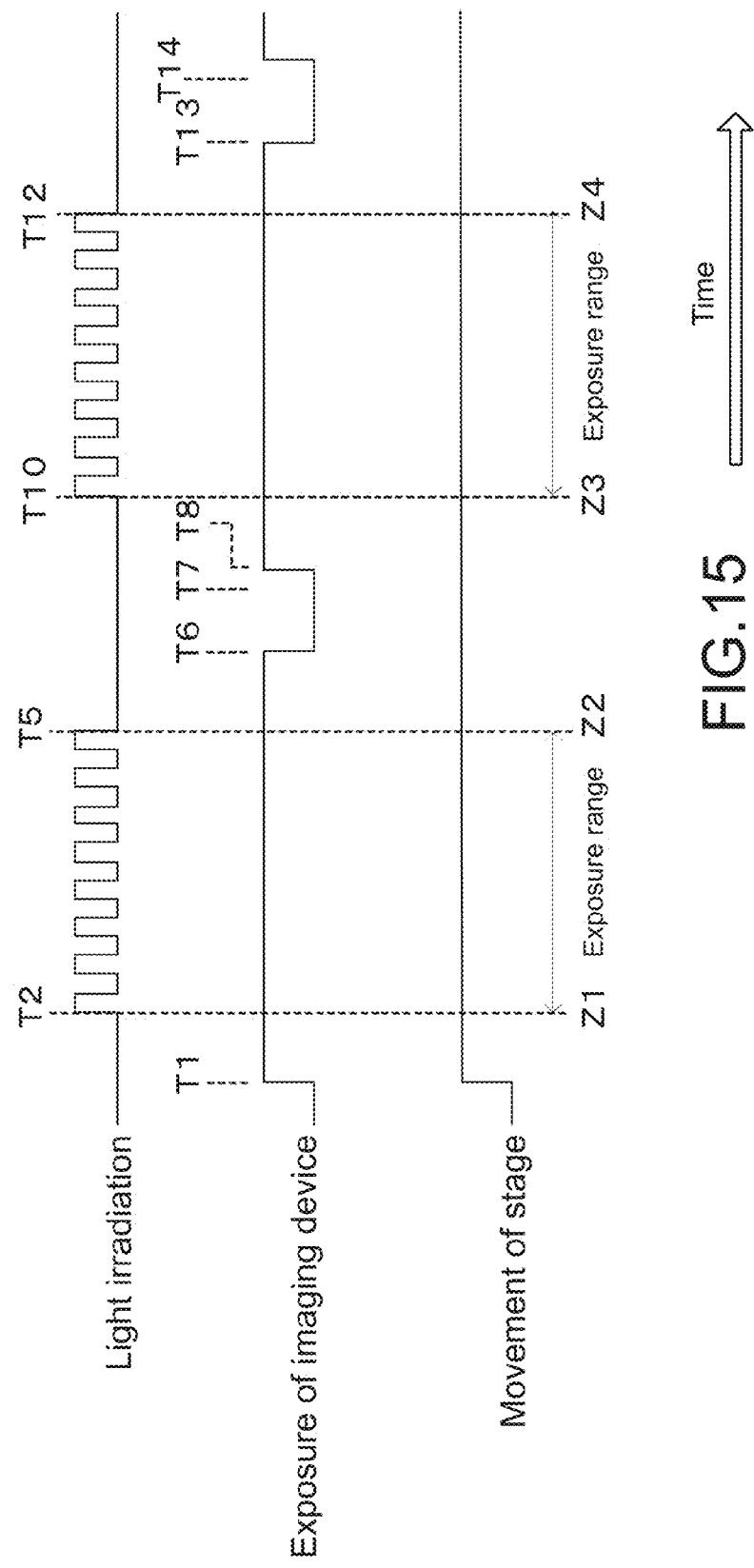
FIG. 15 is a timing chart of Modified example 3, showing operations at a time of Z-stack imaging.

FIG. 15 is a timing chart of Modified example 3, showing operations at a time of Z-stack imaging.

An image acquisition apparatus in Modified example 3 is configured to repeatedly switch between on and off of the light irradiation of the light source unit 13 in certain cycles shorter than the intervals between the focal positions, during the successive exposure of the imaging device 14 across the plurality of successive focal positions. Effects of the image acquisition apparatus 100 according to the embodiment described above and the image acquisition apparatus of Modified example 2 are also produced by Modified example 3. Further, according to Modified example 3, an exposure time is adjusted by selecting an on-duty ratio of the light irradiation.

MODIFIED EXAMPLE 4

FIG. 16 is a timing chart of Modified example 4, showing operations at a time of Z-stack imaging.

An image acquisition apparatus in Modified example 4 synchronizes a timing of the light irradiation by the light source unit 13 and a timing of the movement of the stage 11 with each other and switches between the movement and the stop of the stage 11 at each of the intervals in the Z stack so that positions to be successively exposed are successively located in each range (see FIG. 2).

Specifically, the stage controller 31 controls the stage 11 to move from the focal position Z1 to the focal position Z2 during one exposure. Upon completion of one exposure, the stage controller 31 stops the stage 11 and controls the stage 11 to move from the focal position Z2 to the focal position Z3 during the next exposure. According to Modified example 4, since the imaging that covers all the ranges in the z-axis direction is performed, a possibility that a part of the observation target may be overlooked and remain not to be imaged is further more reduced, as compared to the embodiment and Modified examples described above.

Although the image acquisition apparatus that performs imaging of a transmitted illumination image has been described, needless to say, the present disclosure is similarly applicable to an apparatus that captures a fluorescence image with use of a dark-field light source.

It should be noted that the present disclosure may take the following structures.

(1) An image acquisition apparatus, including:
an optical system including an objective lens for magnifying a portion of an imaging target;
an imaging device that is capable of performing all-pixel simultaneous exposure and is configured to image the portion magnified by the optical system;
a movement controller configured to move a focal point of the objective lens in a thickness direction of the portion of the imaging target; and
a multiple exposure processing unit configured to perform multiple exposure of the imaging device at a plurality of positions such that, for each of ranges sectioned by positions in a direction in which the focal point is movable, an average image that covers each of the ranges is obtained.

(2) The image acquisition apparatus according to (1), in which
the range has a length equal to or smaller than a value obtained by multiplying a focal depth of the optical system by a multiple number of the exposure.

(3) The image acquisition apparatus according to any one of (1) and (2), in which
the multiple exposure processing unit performs multiple exposure of the imaging device with the focal position of the objective lens being moved.

(4) The image acquisition apparatus according to any one of (1) and (2), in which
the multiple exposure processing unit successively expose the imaging device across the plurality of positions.

(5) The image acquisition apparatus according to (4), in which
the plurality of positions successively exposed in each of the ranges are successively located in each of the ranges.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An image acquisition apparatus, comprising:
an optical system including an obiective lens configured to magnify a portion of an imaging target;
an image sensor configured to perform all-pixel simultaneous exposure and image the portion magnified by the optical system;
a processor configured to move a focal point of the objective lens in a thickness direction of the portion of an imaging target;
the processor configured to perform a first exposure of the image sensor at a first focal position of the objective lens and a second exposure of the image sensor at a second focal position such that an average image for the first focal position and the second focal position is obtained; and
the processor configured to add, in the image sensor, electric charges accumulated in the image sensor corresponding to the first exposure of the image sensor at the first focal position and the second exposure of the image sensor at the second focal position to obtain the average image,
wherein each range of a plurality of focal positions has a length equal to or smaller than a length obtained by multiplying a focal depth of the objective lens by a number of exposures performed for the image sensor,
wherein intervals between the focal positions are set to be the same as the focal depth of the optical system including the obiective lens.

2. The image acquisition apparatus according to claim 1, wherein the processor is configured to perform the first exposure and the second exposure of the image sensor with a focal position of the objective lens being moved.

3. The image acquisition apparatus according to claim 1, wherein the processor is configured to successively expose the image sensor across the plurality of focal positions.

4. The image acquisition apparatus according to claim 3, wherein the plurality of focal positions successively exposed in each range are successively located in each of the ranges.

5. The image acquisition apparatus according to claim 1, wherein the processor is configured to add the electric charges accumulated in each light-emitting unit of all pixels of the image sensor corresponding to the first exposure of the image sensor at the first focal position, the second exposure at the second focal position, and a third exposure at a third focal position to obtain the average image for the first focal position, the second focal position, and the third focal position.

6. The image acquisition apparatus according to claim 1, wherein the processors is configured to add the electric charges accumulated in each light-emitting unit of all pixels of the image sensor corresponding to the first exposure of the image sensor at the first focal position, the second exposure at the second focal position, a third exposure at a third focal position, and a fourth exposure at a fourth focal position to obtain the average image for the first local position, the second focal position, the third focal position, and the fourth focal position.

7. An image acquisition method, comprising:
moving, by a controller, a focal point of an objective lens in an optical system in a thickness direction of a portion of an observation target;
performing, by the controller, a first exposure of an imaging sensor configured to perform all-pixel simultaneous exposure and image the portion magnified by the optical system at a first focal position of the objective lens and a second exposure of the imaging sensor at a second focal position; and
adding, in the imaging sensor, charges accumulated in the imaging sensor corresponding to the first exposure of the imaging sensor at the first focal position and the second exposure of the imaging sensor at the second focal position to obtain an average image for the first focal position and the second focal position,
wherein each range of a plurality of focal positions has a length equal to or smaller than a length obtained by multiplying a focal depth of the objective lens by a number of exposures performed for the imaging sensor,
wherein intervals between the focal positions are set to be the same as the focal depth of the optical system including the objective lens.

8. A non-transitory computer readable storage medium having stored thereon, a set of computer executable instructions to cause a computer to perform steps comprising:
moving a focal point of an objective lens in an optical system in a thickness direction of a portion of an imaging target;
performing a first exposure of an imaging sensor configured to perform all-pixel simultaneous exposure and image the portion magnified by the optical system, at a first focal position of the objective lens and a second exposure of the imaging sensor at a second focal position such that, an average image for the first focal position and the second focal position is obtained, wherein charges accumulated in the imaging sensor corresponding to the first exposure of the imaging sensor at the first focal position and the second exposure of the imaging sensor at the second focal position are added, in the imaging sensor, to obtain the average image, wherein each range of a plurality of focal positions has a length equal to or smaller than a value length obtained by multiplying a focal depth of the objective lens by a number of exposures performed for the image sensor, wherein intervals between the focal positions are set to be the same as the focal depth of the optical system including the objective lens.

\* \* \* \* \*